Nov. 20, 1956     L. P. CLARK, JR     2,771,309

UNIVERSAL BALL AND SOCKET JOINT

Filed June 10, 1954

Inventor

LANCASTER P. CLARK, JR.

By

Attorney

United States Patent Office 2,771,309
Patented Nov. 20, 1956

2,771,309
UNIVERSAL BALL AND SOCKET JOINT

Lancaster P. Clark, Jr., Fairfield, Conn., assignor to Clark Metal Products, Inc., Fairfield, Conn., a corporation of Connecticut Application June 10, 1954, Serial No. 435,744

2 Claims. (Cl. 285—169)

The present invention relates to a universal ball and socket joint, particularly for use with electric light fixtures, and provided for this purpose with a passage extending therethrough for receiving the wires extending to the fixture.

An object of the invention is to provide a device of this character of relatively simple and inexpensive construction, and particularly wherein the socket forming parts consisting of a shell and a spring loaded socket member within the shell are adapted to be formed from relatively thin metal in the form of drawn tubular stock.

A further object is to provide a spring assembly which will permit the spring to be pressed under permanent tension through the assembly of the parts of the joint, and in which the spring will be effectually positioned against displacement with respect to its seat within the joint, the latter consisting of a narrow annular shoulder formed in the wall of the shell. In particular, it is proposed to provide upon the spring loaded socket member a tubular extension disposed within the coils of the spring to provide a walled passage through the spring for the wires to the fixture and a support for the spring to maintain the seat engaging end coil thereof against inward displacement through pressure exerted thereon. Thus, the spring will be maintained upon its seat within the shell thus preventing the possibility of the spring being wedged downwardly within the shell below its seat, as might occur when relatively great compression is applied to the spring through the assembly of the parts of the joint.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

Figure 1:
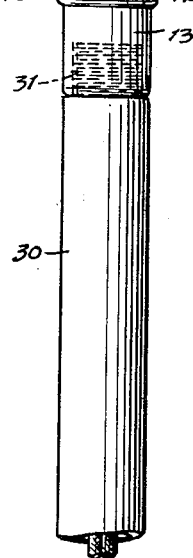
Fig. 1 is a side elevational view showing an electric light socket mounted upon the joint of the invention, the latter being mounted upon a tubular support.
Figure 2:
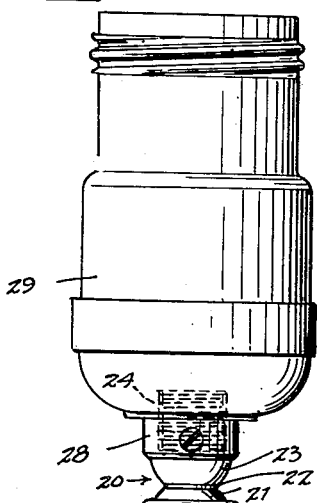
Fig. 2 is an enlarged view of the joint, partially in side elevation and partially in vertical section.
Figure 4:
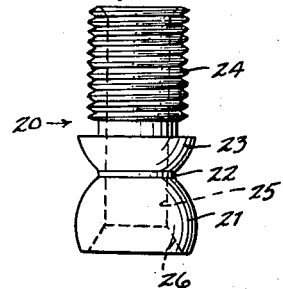
Fig. 4 is a side elevation of the ball member of the joint.

Referring to the drawings, the universal ball and socket joint, according to the exemplary embodiment of the invention illustrated therein, comprises a shell indicated generally as 10, including an upper cylindrical tubular portion 11 terminating at its lower end in an inwardly extending annular shoulder 12 and a lower tubular cylindrical portion 13 extending downwardly from the shoulder 12 and which is of smaller diameter than the upper portion 11. At the lower end of the portion 13, an extended portion 14 thereof is turned or curled within the portion 13 and has internal screw threads 15 formed therein, preferably by rolling, so that the formation of the threads does not materially reduce the thickness of the metal.

A helical spring 16 is engaged within the upper part 11 of the shell and seats upon the shoulder 12, its external diameter being such that it is loosely disposed within the shell. The spring is formed of cylindrical spring wire of substantial thickness, its cross-sectional diameter being such that a substantial portion of the lower coil is disposed inwardly of the inner edge of the shoulder 12, the point of contact of the shoulder with the spring being slightly outwardly of a vertical line passing through the center of the spring wire. Excessive downward pressure upon the spring would, in the absence of proper support of the spring against inward displacement, result in forcing the lower coil of the spring off of the shoulder 12 wedging it downwardly within the lower portion 13 of the shell, and thus obstructing the wire passage. This condition is effectively alleviated in the present invention.

Figure 5:
Fig. 5 is a side elevation of the spring loaded socket member.

The socket member 17, as shown in Fig. 5, is in the form of a drawn metal tube, its formation being somewhat similar to the formation of an eyelet, and comprises an upper socket portion 18 of substantially hemispherical form, its upper edge being in or slightly below the diametric plane of a sphere having the radius of the ball of the joint member, presently to be more fully described. A lower cylindrical tubular portion 19 extends downwardly from the socket portion 18 and is of an outside diameter to fit within the spring 16 to support the coils of the spring against inward displacement, the lower end of the portion 19 extending below the lower end of the spring and being flared outwardly as at 19a, and its diameter being such that the annular space between its outer periphery and the inner periphery of the shoulder 12 of the shell is substantially less than the diameter of the spring wire of the spring 16, so that there is no possibility of the lower coil of the spring being wedged downwardly through the annular space.

Figure 3:
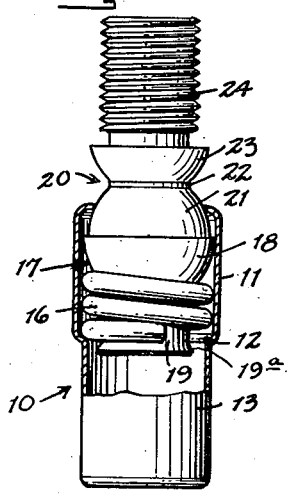
Fig. 3 is a vertical sectional view of the joint, the dot-and-dash lines indicating one position of angular adjustment of the joint.
Figure 6:
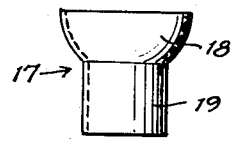
Fig. 6 is a side elevation of the spring.
Figure 7:
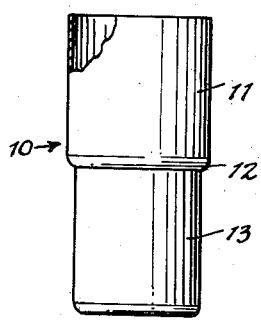
Fig. 7 is a side elevation of the shell, prior to assembly of the parts shown in Figs. 4, 5 and 6 therewith.

The ball member 20 comprises a lower truncated ball portion 21 joined by a reduced neck portion 22 with an upper truncated ball portion 23 from which an externally threaded stud 24 extends upwardly, the upper flat side of the portion 23 forming a stop shoulder at the lower end of the threaded stud. A tubular passage 25 extends through the ball member, the lower end of the passage being of divergent form, as at 26, so that in an angular position of adjustment of the ball member, as shown for instance in the dot-and-dash lines in Fig. 3, a clear and unobstructed passage extends through the joint for the wire to the lighting fixture or the like, so there is no possibility of crimping or otherwise injuring the wire.

In assembling the joint, the spring is seated upon the annular shoulder 12 of the shell, the socket member 17 has its lower tubular portion 19 engaged within the spring, and the ball end portion 21 of the ball member 20 is engaged within the upper hemispherical socket portion 18. Thereupon axial pressure is applied, as between the ball member and the shell member, causing the spring to be placed under compression. When so compressed, the upper edge of the upper portion 11 of the shell is curled inwardly as at 27 to engage the spherical surface of the ball portion 21 at a point above its diametric plane which is normal to the vertical axis of the ball member when the latter is in vertically aligned relation with the shell. At the same time the lower end of the portion 19 of the socket member is flared outwardly, as at 19a by insertion of a suitable flaring tool upwardly through the shell. When so engaged the ball is retained against outward movement under the pressure of the compressed spring 16, the spring loaded socket member 17 being pressed into frictional engagement with the ball portion 21 and forcing the latter into frictional engagement with the curled end portion 27. Thus it is possible to impart angular movement to the ball member in any desired direction, and the frictional relationship between the shell, the socket member and the ball member will retain the position of adjustment against such normal loads thereon as the weight of the lamp socket and any parts normally associated therewith. The disposition of the tubular portion 19 within the coils of the spring prevents entry and clogging of frayed insulation material between the coils. The flared end 19a provides a guide for the wire cord during its insertion, so that exposed wire ends will not be snagged or obstructed by the end of the socket member or by the spring.

As shown in Fig. 1, the joint is shown engaged in the internally threaded lower end collar 28 of a lamp socket 29, and a supporting tube 30, having an externally threaded stud 31 at its end, is screwed into the internally threaded lower end of the portion 13 of the shell. Obviously, the joint is adapted for many similar applications, and a number of the joints may be joined together to provide for increase in the angle of adjustment of the lamp or other part supported thereon, the externally threaded end 24 of one joint being engageable with the internally threaded end 15 of a similar joint.

What is claimed is:

1. A universal ball and socket joint for receiving an electric conductor wire therethrough, comprising a tubular shell member including an upper cylindrical wall portion and a lower cylindrical wall portion of smaller diameter than said upper wall portion and integrally connected thereto by an annular shoulder having its inner edge coincident to the inner surface of said lower wall portion, a coiled wire helical compression spring formed of circular cross-section wire disposed within said upper wall portion and seated upon said annular shoulder, the radius of the coils of said spring to the center of the wire being less than the radius of said inner edge of said shoulder, a socket member disposed within said upper socket portion including an upper substantially hemispherical socket portion engaged at its outer surface with the upper end of said spring, and a cylindrical tubular portion fitted within and extending below the lower end of said spring to support the coils thereof against inward displacement, the annular space between said tubular portion and the inner edge of said shoulder being of less radial dimension than the thickness dimension of said wire of said spring, and a ball member having a wire receiving passage therethrough and including a truncated ball portion seated for swivelling movement upon the inner surface of said socket portion of said socket member and an upper externally threaded portion extending upwardly from said upper wall portion of said shell member, the upper side of said upper wall portion being extended inwardly to engage the upper surface of said ball portion along a circular line of less diameter than the diameter of said ball portion with said spring held under compression through said engagement of said inwardly extended edge with said ball portion, and said lower wall portion of said tubular shell member extending substantially below the lower end of said cylindrical portion of said socket member and having internal screw threads of matching pitch and diameter to said external screw threads of said ball member.

2. The invention as defined in claim 1, further characterized in that the lower end of said cylindrical tubular portion of said socket member is flared outwardly below said spring.

References Cited in the file of this patent

UNITED STATES PATENTS

| | | |
|---|---|---|
| 859,426 | Betz | July 9, 1907 |
| 872,121 | Greenlaw | Nov. 26, 1907 |
| 2,472,624 | Schwartz | June 7, 1949 |